UNITED STATES PATENT OFFICE.

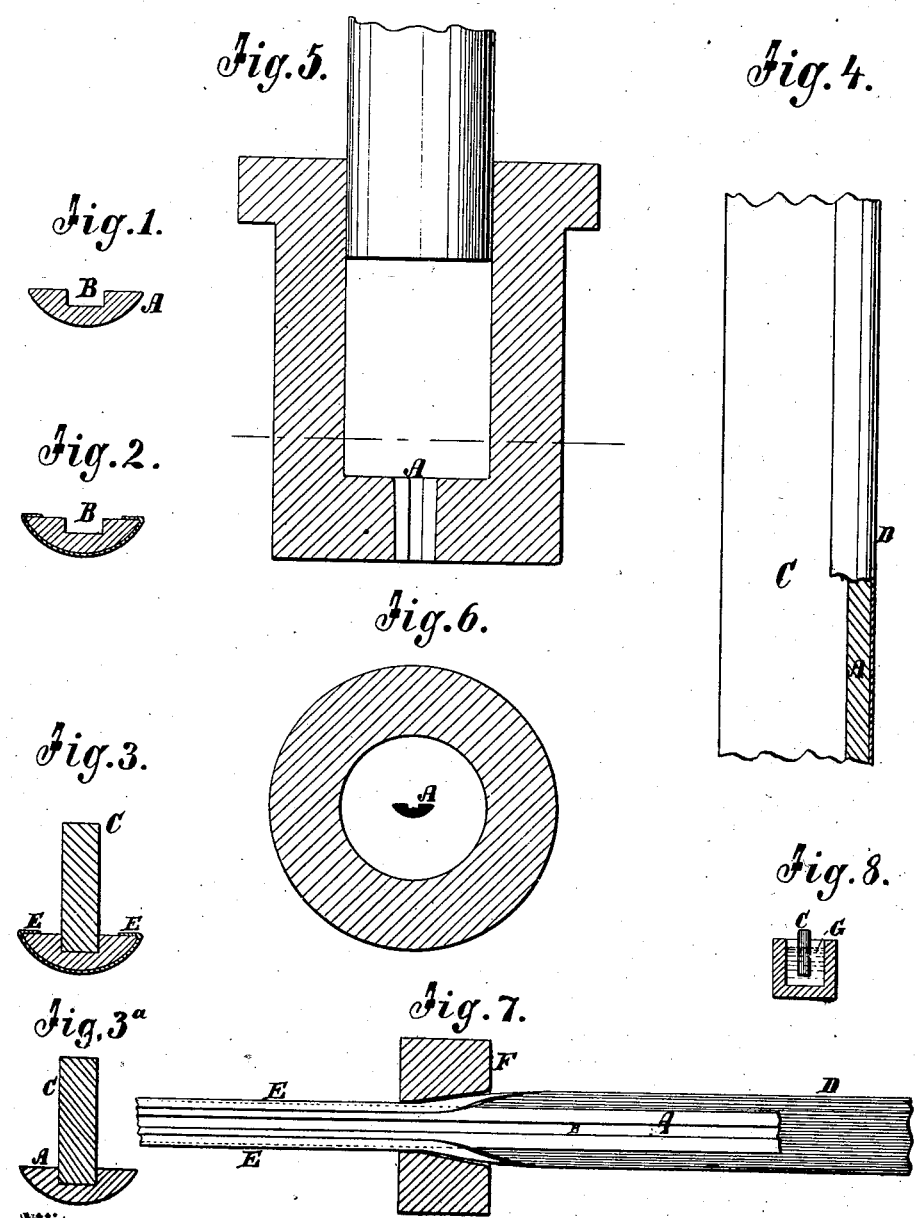

JOHN D. MORAN, OF NEW YORK, N. Y.

IMPROVEMENT IN METAL WINDOW-SASHES.

Specification forming part of Letters Patent No. 140,588, dated July 8, 1873; application filed September 21, 1872.

*To all whom it may concern:*

Be it known that I, JOHN D. MORAN, of the city, county, and State of New York, have invented a new and useful Improvement in the Manufacture of Plated Moldings for Windows, of which the following is a specification:

My invention consists in making the oval-headed T-shaped moldings or bars for show-windows by first forming an oval or semi-elliptical bar of lead with a groove in the flat side for the base of the head of the molding, by forcing the head through a die of suitable form in the manner of forming lead tubes; second, in drawing the silver-plated cover of sheet metal upon the said lead bar or oval head for the molding, by forcing a flat strip of the covering-metal and the lead bar through a die-plate together; and third, in soldering the iron bar which constitutes the vertical portion of the T to the lead bar by heating one edge of the iron bar in a bath of solder and tinning it at the same time and then laying the tinned and heated edge in the groove of the lead bar, whereby they become united, the iron bar heating the lead bar sufficiently to cause the union of the lead with the tinned surface of the iron when they become cool; fourth, in making a cheap bar or molding for inferior work, where the plated molding will be too expensive, by uniting the lead and metal bars, as above described, without the plated metal covering for the lead bar.

By these methods I produce bars or moldings much more uniform and regular in shape, also much cheaper, than the bars made in the ordinary way, which consists in soldering the iron bar into the concave side of the plated cover of the head by hand, the said plated cover being previously bent into the required shape in any approved way, which requires skilled labor; and at best the sheet-metal cover will be considerably warped and bent by the heat of the solder. I also make my bars cheaper by this mode of connecting and soldering the tinned iron bar with the lead bar, I can use cheaper material for the latter than can be used in the common way, because that mode of soldering necessitates the use of solder where I use lead.

Figure 1 is a cross-section of the lead bar, which I first make to form the head of the molding. Fig. 2 is a cross-section of the same with the sheet-metal plated cover applied. Fig. 3 is a cross-section of the complete bar or molding. Fig. 3ª is a cross-section of the bar or molding without the plated cap. Fig. 4 is partly a side elevation and partly a longitudinal sectional elevation of Fig. 3. Fig. 5 is a sectional elevation of a press such as may be used for making the lead bar, Fig. 1, by forcing the lead through the die A at the bottom, said die being in the form shown in Fig. 6. Fig. 6 is a horizontal section of Fig. 5. Fig. 7 is a horizontal section of a die-plate and plan of a section of the lead bar, Fig. 1, also a section of a strip of plated sheet-metal cover, showing the manner of "drawing" the sheet-metal cover on the lead bar; and Fig. 8 is a cross-section of a bath of solder with the iron bar partly immersed for heating and tinning, the edge to be inserted in the groove of the lead bar and soldered to it.

Similar letters of reference indicate corresponding parts.

A represents the lead bar for the base of the oval T-head of the complete bar represented in Fig. 3, which is semi-elliptical in cross-section, with a groove, B, in the flat side along the center for receiving the edge of the flat iron bar C to be soldered to it. This bar is produced from lead by forcing or drawing it through the die A. D is the strip of copper or other soft thin plated metal for covering the head of the bar with a silver-plated surface. This strip is made wide enough to fasten upon the lead bar by lapping the edges E over the edges of the lead bar and upon the flat side, and is drawn on the lead bar or wrapped around it by drawing the two through a draw-plate, F, in the manner shown in the Fig. 7. The lead and iron bars are then united by heating the iron bars in a bath, G, of molten solder and placing the heated edge in the groove B of the bar A, which heats the walls of the groove B, so that its tinned surface readily unites with the lead when they cool.

Each of these operations can be performed by unskilled hands, and the work can be done more quickly than by the old process, and, besides, the bars will be more accurate and uniform in finish.

For inferior work I propose to make a molding of the iron bar C and the lead bar A without the plated cap, the said bars being made and united in the same manner as above described. This cannot be accomplished in the ordinary way of constructing these moldings.

Having thus described my invention, I claim as new and desire to secure by Letters Patent—

1. The construction of plated moldings or bars for windows by the method herein described—that is to say, by forming the body of the head, in the shape described, of lead, by forcing it through a die, A, drawing the plated cover on the lead bar in a draw-plate and soldering the iron bar and lead bar together by placing the iron bar heated in a bath of solder in the groove of the lead bar, all substantially as specified.

2. The new article of manufacture consisting of a plated molding or bar for show-windows, constructed by the method herein described.

3. A molding or bar for show-windows, consisting of the iron bar C and lead bar A, constructed and united substantially as specified.

JOHN D. MORAN.

Witnesses:
C. SEDGWICK,
T. B. MOSHER.